United States Patent [19]
Takahashi

[11] Patent Number: 5,847,888
[45] Date of Patent: Dec. 8, 1998

[54] OPTICAL SYSTEM FOR TV CAMERA

[75] Inventor: Masami Takahashi, Zushi, Japan

[73] Assignee: Matsushita Electric Industrial Co., Ltd., Osaka, Japan

[21] Appl. No.: 938,883

[22] Filed: Sep. 26, 1997

[30]    Foreign Application Priority Data

Sep. 27, 1996  [JP]  Japan .................................. 8-275315
May 22, 1997  [JP]  Japan .................................. 9-148615

[51] Int. Cl.[6] ....................................................... G02B 7/02
[52] U.S. Cl. ........................................... 359/823; 359/824
[58] Field of Search .................................. 359/823, 824, 359/826, 830, 819

[56]    References Cited

U.S. PATENT DOCUMENTS 5,005,948  4/1991  Takahashi et al. ........................ 359/823

*Primary Examiner*—Hung Xuan Dang
*Attorney, Agent, or Firm*—Lowe Hauptman Gopstein Gilman & Berner

[57]    ABSTRACT

An optical system for a TV camera is provided which includes an escutcheon, an FB adjusting ring, a bracket, and retainers. The escutcheon has disposed therein a lens. The FB adjusting ring is installed on the escutcheon to be movable along an optical axis of the optical system. The bracket has mounted thereon an image pick-up device and is disposed to be movable to or away from the escutcheon according to the movement of the FB adjusting ring for adjusting an flange back (FB) distance. The retainers retain the bracket on the escutcheon at two support points in optical alignment with each other. Each of the retainer includes a screw and a spring. The screw fastens the bracket to the escutcheon. The spring urges the bracket against the escutcheon. With this arrangement, the adjustment of the FB distance is achieved by rotating the FB adjusting ring without any backlash in movement of the bracket.

4 Claims, 5 Drawing Sheets

OPTICAL SYSTEM FOR TV CAMERA

BACKGROUND OF THE INVENTION

1. Technical Field of the Invention

The present invention relates generally to an improvement on an optical system for TV cameras, especially CCTV cameras.

2. Background of Related Art

FIG. 7 shows a conventional optical system 100 of a TV camera which includes a front escutcheon 101, an FB adjusting ring 102, an image pick-up device mount 105, a bracket 106, and a front chassis 108. The FB adjusting ring 102 engages the front escutcheon 101 movably in a longitudinal direction of the optical system 100 to adjust a flange back (FB) distance that is the distance between a lens bearing surface (not shown) and an image pick-up position. The image pick-up device mount 105 has mounted thereon an image pick-up device 103 in electrical connection with an image pick-up device substrate 104. The bracket 106 has disposed thereon the image pick-up device mount 105. The front chassis 108 has disposed thereon coil springs 107 to urge the bracket 106 toward the front escutcheon 101.

The FB adjusting ring 102 has formed in its inner wall a threaded portion 102*a* which engages a threaded portion 101*a* formed on the front escutcheon 101. The rotation of the FB adjusting ring 101 in engagement of the threaded portion 102*a* with the threaded portion 101*a* causes the FB adjusting ring 101 to be moved back and forth to displace the bracket 106 in the longitudinal direction.

On a back surface of the bracket 106 facing the image pick-up device mount 105, a pair of protrusions supporting ends of the coil springs 107. On a front surface of the front chassis 108 facing the racket 106, a pair of protrusions 108*a* supporting the other ends of the coil springs 107. The bracket 106 has disposed thereon the image pick-up device mount 105 using screws 105*a* (only one is shown) and has formed therein an opening 106*b* through which the image pick-up device 103 mounted on the image pick-up mount 105 is exposed.

The adjustment of the FB distance is achieved by rotating the FB adjusting ring 102 so that it moves back and forth to displace the bracket 106 along with the image pick-up device 103 disposed on the image pick-up device mount 105.

The above optical system 100, however, has the drawback in that play is created, as shown in FIG. 7, between recessed portions 101*b* (only one is shown) of the front escutcheon 101 and protrusions 106*c* of the bracket 106 in a widthwise direction thereof, resulting in a backlash in rotation of the FB adjusting ring 102, which will cause an image plane to be moved during adjustment of the FB distance.

Additionally, in the structure of the optical system 100, the bracket 106 is urged against the front escutcheon 101 by a spring force produced by the coil springs 107 and the front chassis 108 for the adjustment of FB distance using the FB adjusting ring 102. This, however, results in complexity of the system structure and an increase in assembling process. The use of the front chassis 108 also results in an increase in overall size of the system.

SUMMARY OF THE INVENTION

It is therefore a principal object of the present invention to avoid the disadvantages of the prior art.

It is another object of the present invention to provide a compact structure of an optical system for a TV camera which is designed to adjust an FB distance between a lens and an image pick-up device without any backlash in movement of an image pick-up device mounting bracket according to rotation of a FB adjusting ring.

According to one aspect of the present invention, there is provided an optical system for a TV camera which comprises: (a) an escutcheon; (b) an FB adjusting ring installed on the escutcheon to be movable along an optical axis of the optical system; (c) a bracket having mounted thereon an image pick-up device, the bracket being disposed to be movable to or away from the escutcheon according to the movement of the FB adjusting ring for adjusting an flange back distance; and (d) a retainer retaining the bracket on the escutcheon in optical alignment with each other, the retainer screwing the bracket to the escutcheon, while urging the bracket against the escutcheon elasticity.

In the preferred mode of the invention, the retainer installs the bracket on the escutcheon at two support points diametrically opposed to each other with respect to the optical axis of the system.

The retainer includes a pair of retaining assemblies each including a screw, a cylindrical member, and a coil spring. The coil spring is disposed around the cylindrical member between a flange portion formed on an end of the cylindrical member and the bracket. The cylindrical member has formed therein a through hole and passes through an opening formed in the bracket in constant engagement with the escutcheon. The screw is inserted through the through hole of the cylindrical member and threaded into the escutcheon for allowing the bracket to be moved between the escutcheon and the flange of each of the retaining assemblies.

The retainer may alternatively include a pair of retaining assemblies each including a cylindrical member and a coil spring. The cylindrical member includes a cylinder, a threaded portion extending from an end of the cylinder, and a flange formed on the other end of the cylinder. The coil spring is disposed around the cylinder between the flange and the bracket. The cylinder passes through an opening formed in the bracket in constant engagement with the escutcheon with the threaded portion being inserted into a threaded portion formed in the escutcheon for allowing the bracket to be moved between the escutcheon and the flange of each of the retaining assemblies.

BRIEF DESCRIPTION OF THE DRAWINGS

The present invention will be understood more fully from the detailed description given hereinbelow and from the accompanying drawings of the preferred embodiment of the invention, which, however, should not be taken to limit the invention to the specific embodiment but are for explanation and understanding only.

In the drawings.

DESCRIPTION OF THE PREFERRED EMBODIMENT

Figure 1:
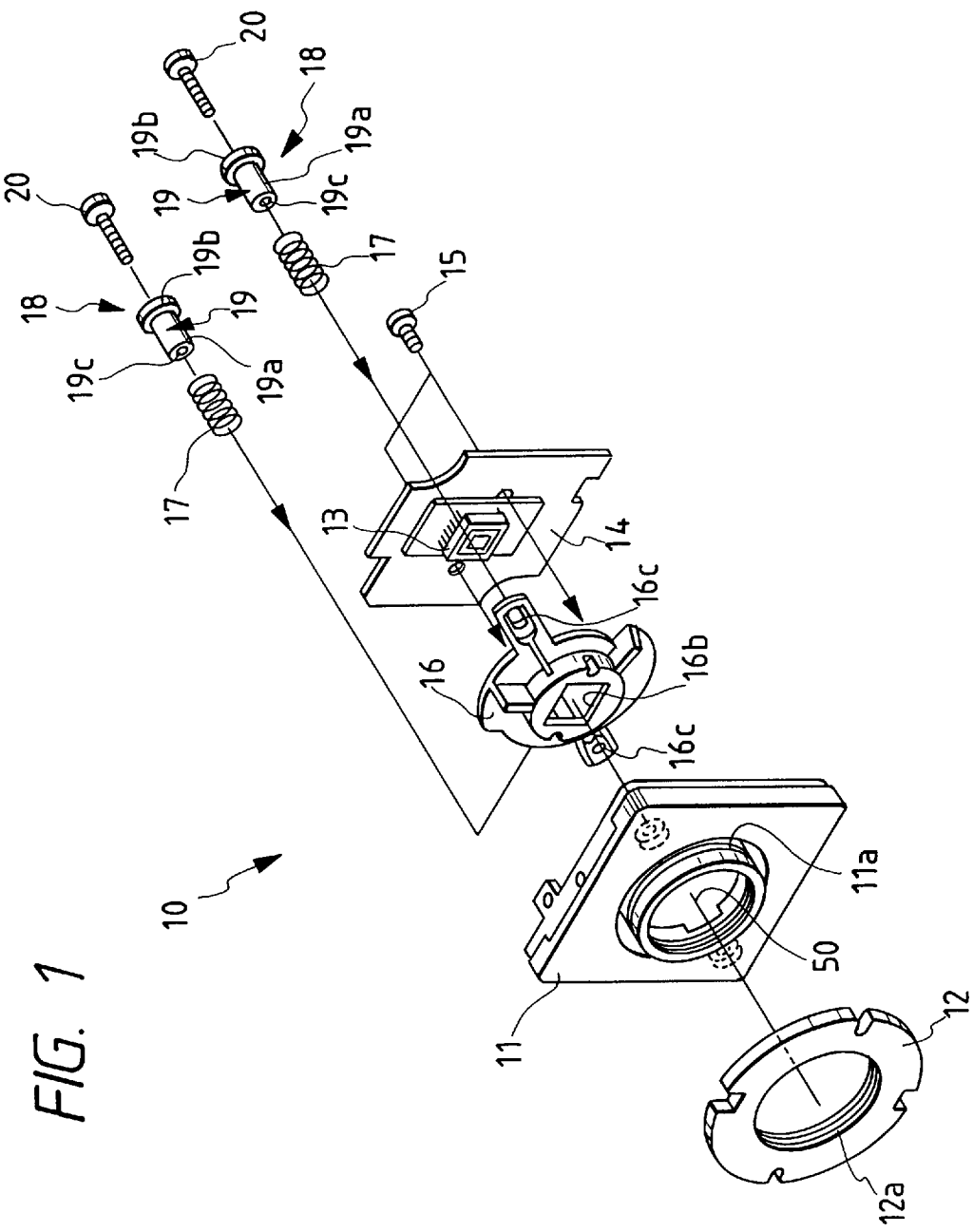
FIG. 1 is an exploded perspective view which shows an optical system for a TV camera according to the first embodiment of the invention.

Referring now to the drawings, particularly to FIG. 1, there is shown an optical system 10 according to the present invention which may be employed in a CCTV camera.

Figure 3:
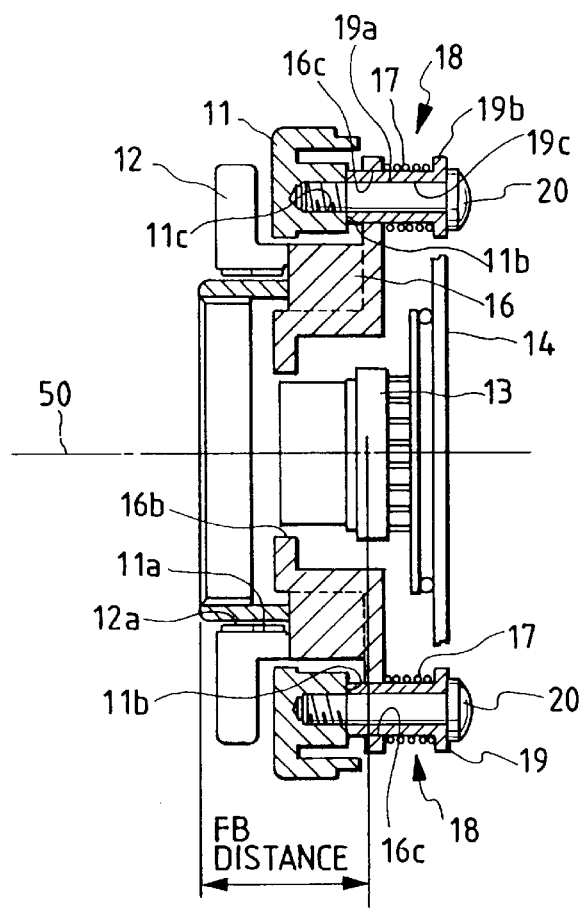
FIG. 3 is a vertical cross sectional view which shows the optical system in FIG. 1.

The optical system 10 generally includes a front escutcheon 11, an FB adjusting ring 12, an image pick-up device substrate 14, a bracket 16, and retainers 18. The FB adjusting ring 12 engages the front escutcheon 11 movably in a longitudinal direction (i.e., an optical axis) of the optical system 10 to adjust a flange back (FB) distance that is the distance, as shown in FIG. 3, between a bearing surface of a lens (not shown) and an image pick-up area of an image pick-up device 13. The image pick-up device substrate 14 has mounted thereon the image pick-up device 13 and is installed on the bracket 16 using screws 15. The retainers 18 urge the bracket 16 toward the front escutcheon 11.

Each of the retainers 18 includes a collar 19, a coil spring 17, and a screw 20. The collar 19 includes a cylindrical portion 19a, a flange 19b formed on an end of the cylindrical portion 19a, and a bore 19c extending through the cylindrical portion 19a and the flange 19b. Each bore 19c may have formed therein an internal thread.

The FB adjusting ring 12 has a threaded portion 12a formed in an inner wall thereof. The front escutcheon 11 also has a threaded portion 11a engageble with the threaded portion 12a of the FB adjusting ring 12. The rotation of the FB adjusting ring 12, thus, causes the FB adjusting ring 12 to be moved to or away from the front escutcheon 11.

Figure 2:
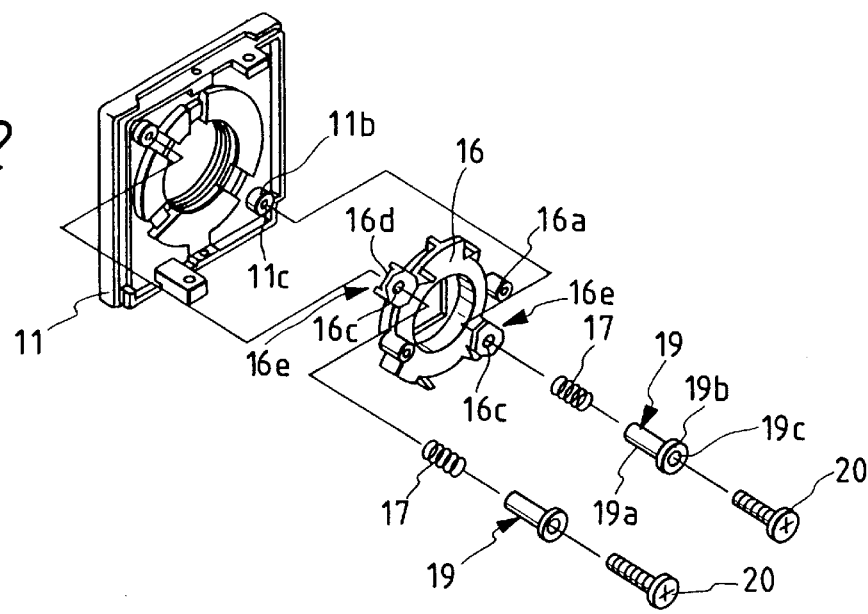
FIG. 2 is an exploded perspective view which shows the structural relation among a front escutcheon, a bracket, and retainers.

The bracket 16 has, as clearly shown in FIG. 2, formed therein internal threads 16a into which the screws 15 are inserted to mount the image pick-up device substrate 14 on the bracket 16. The bracket 16 also has a rectangular opening 16b through which the image pick-up device 13 mounted on the image pick-up device substrate 14 is exposed and a pair of mounting portions 16e diametrically opposed to each other with respect to the center of the bracket 16. Each of the mounting portions 16e has formed therein a mounting bore 16c into which one of the cylindrical portions 19a of the collars 19 is fitted and formed around the mounting bore 16c a flange portion 16d for supporting an end of one of the coil springs 17 compressed by the flange 19b of the collar 19.

On a back surface of the front escutcheon 11, a pair of bosses 11b, as shown in FIG. 2, are formed. Each of the bosses 11b has formed therein an internal thread 11c which the screw 20 inserted into the bore 19c of one of the collars 19 engages and retains at the periphery of the thread 11c an end of the cylindrical portion 19a of the collar 19.

FIG. 3 shows a vertical cross section of the optical system 10 which is assembled completely.

On the bracket 16, the image pick-up device substrate 14 on which the image pick-up device 13 is mounted is installed by the screws 15 (not shown in FIG. 3). This structure ensures correct orientation of an optical axis of the system 10.

The installation of the bracket 16 on the front escutcheon 11 is accomplished in the following manner.

First, the coil springs 17 are disposed around the cylindrical portions 19a of the collars 19, and the cylindrical portions 19a are inserted into the mounting bores 16c of the bracket 16 with press fit. The coil springs 17 are held between the flanges 19b of the collars 19 and the flange portions 16d of the bracket 16.

Next, the ends of the collars 10 fitted into the mounting bores 16c of the bracket 16 are brought into engagement with the bosses 11b of the front escutcheon 11.

Finally, the screws 20 are inserted into the internal threads 11c formed in the bosses 11b through the bores 19c of the collars 19 and then tightened. This secures the bracket 16 on the front escutcheon 11 without any play. The center 50 of a lens threaded bore formed in an inner wall of the front escutcheon 11 is aligned with the center of a photosensitive area of the image pick-up device 13. The coil springs 17 urge the bracket 16 against the back surface of the front escutcheon 11 at all times.

Figure 7:
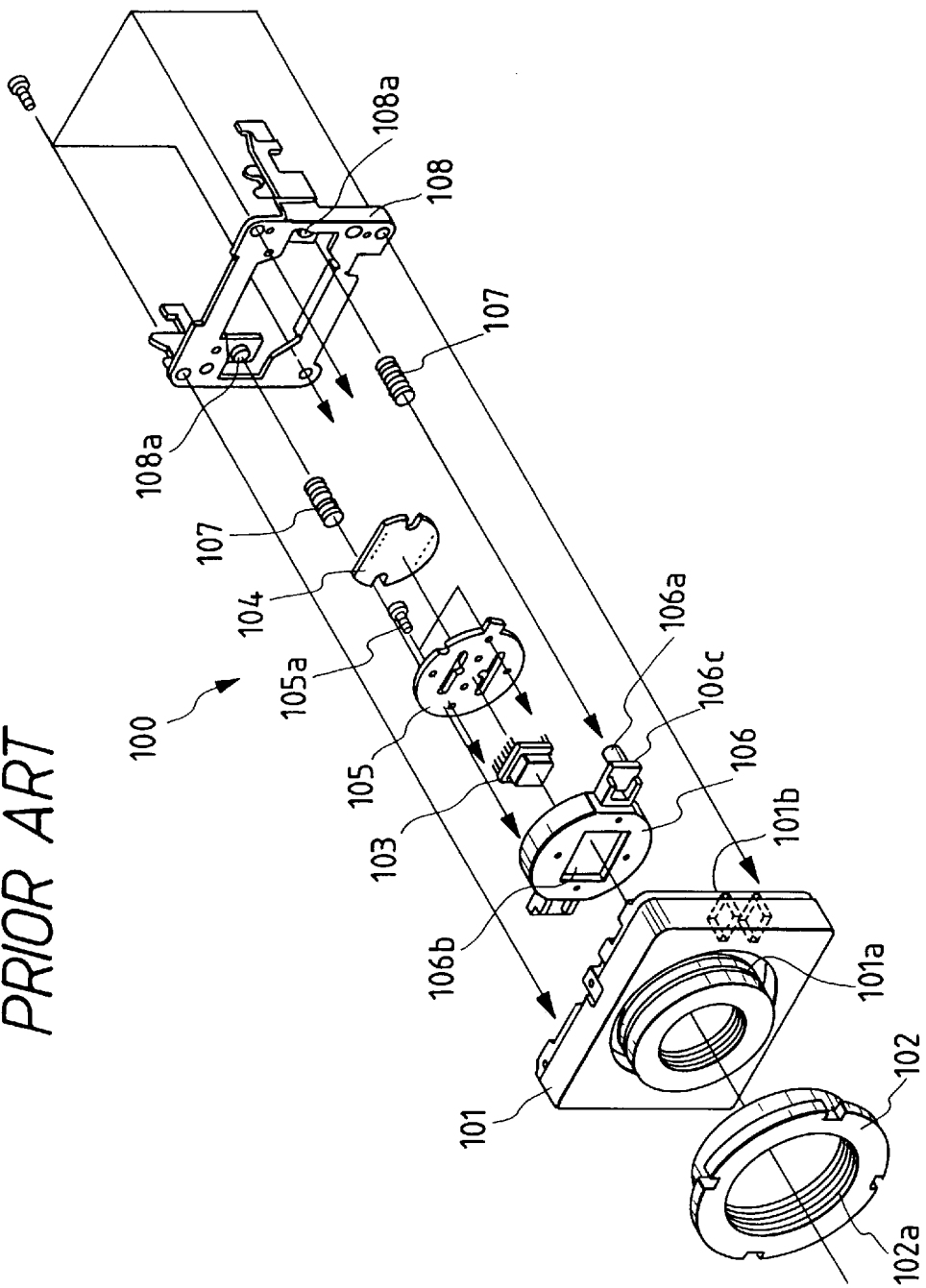
FIG. 7 is an exploded perspective view which shows a conventional optical system for a TV camera.

The FB adjusting ring 12 is installed in the front escutcheon 11 in engagement of the threaded portion 12a with the threaded portion 11a of the front escutcheon 11. The adjustment of the FB distance is achieved by rotating the FB adjusting ring 12 to move the FB adjusting ring 12 toward or away from the front escutcheon 11, displacing the bracket 16 together with the image pick-up device 13 along the optical axis of the system 10. This eliminates any backlash which would be produced in the conventional system, as shown in FIG. 7, in positioning of the image pick-up device through the FB adjusting ring, thereby resulting in high-accuracy FB distance adjustment.

The structure of the optical system 10 also eliminates the need for the front chassis used in the conventional system, thereby allowing the size of the image pick-up device substrate 14 to be increased. For example, it is possible to use an image pick-up device substrate having an area substantially equal to a sectional area of the whole structure of the optical system 10, thereby allowing different circuit components which are mounted on separate substances in a conventional system to be mounted together on the image pick-up device substrate. This decreases the number of assembling processes and manufacturing costs greatly.

Figure 4:
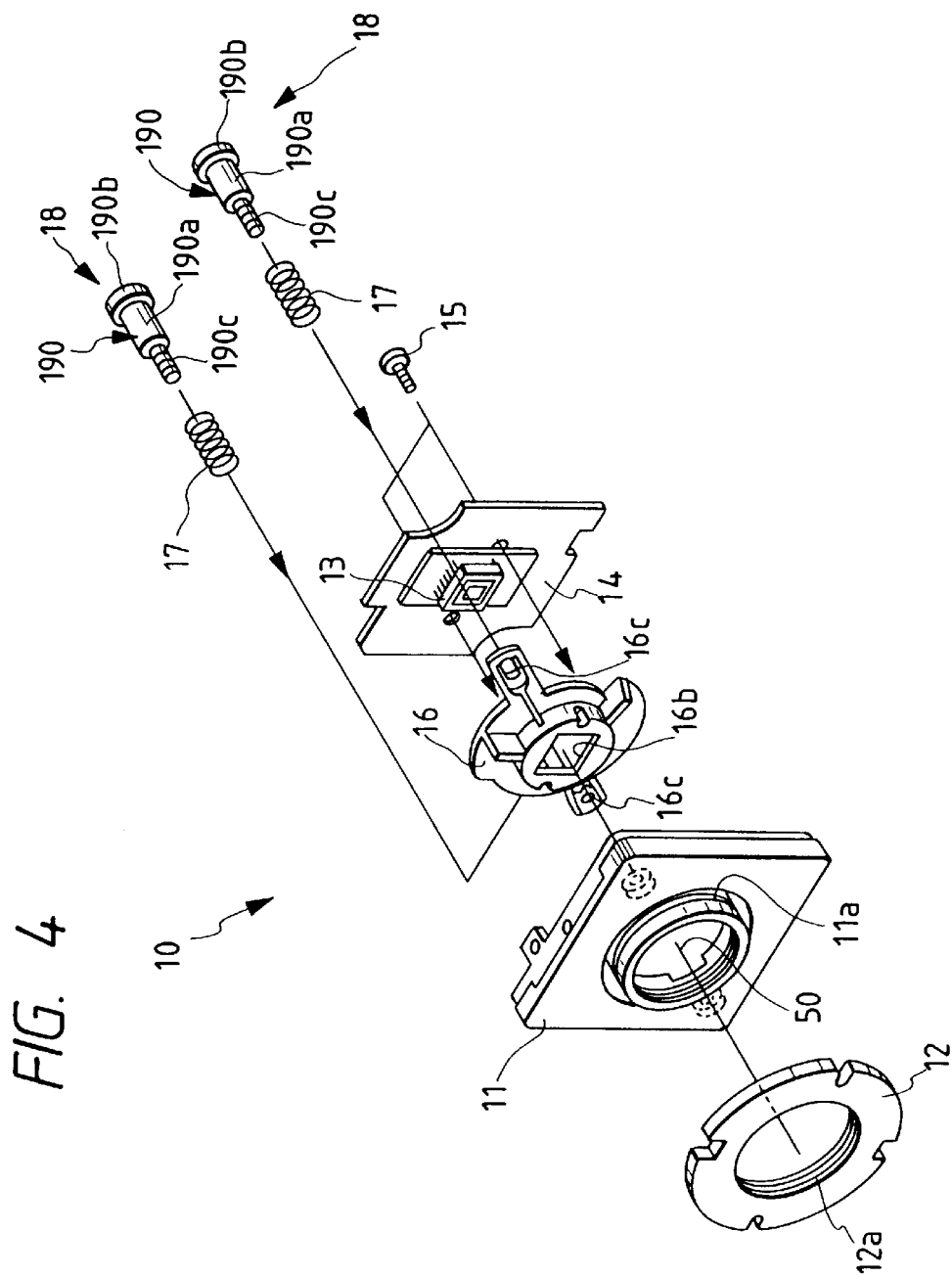
FIG. 4 is an exploded perspective view which shows an optical system for a TV camera according to the second embodiment of the invention.
Figure 5:
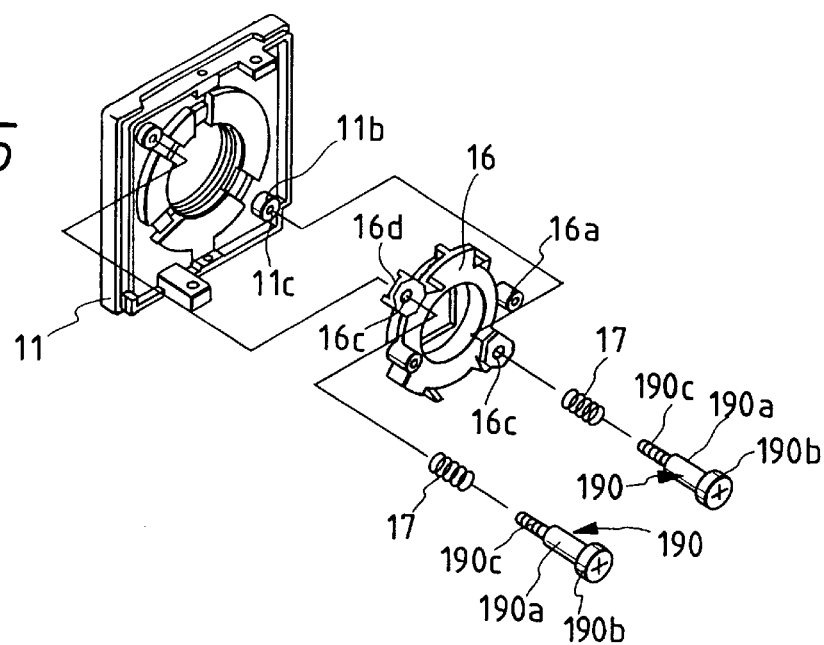
FIG. 5 is an exploded perspective view which shows the structural relation among a front escutcheon, a bracket, and retainers.
Figure 6:
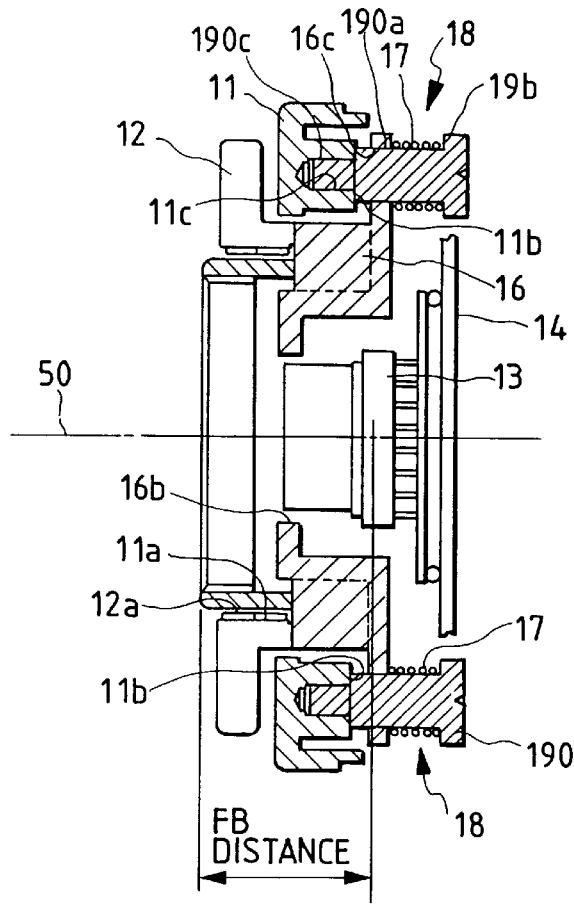
FIG. 6 is a vertical cross sectional view which shows the optical system in FIG. 4.

FIGS. 4 to 6 show the optical system 10 for a CCTV camera according to the second embodiment of the invention which is different from the first embodiment only in structure of the retainers 18. Other arrangements are identical, and explanation thereof in detail will be omitted here.

Each of the retainers 18 includes a collar 190. The collar 190 includes a cylindrical portion 190a, a flange 190b (i.e., a screw head), and a threaded portion 190c. The threaded portion 190c is smaller in diameter than the cylindrical portion 190a and extends from an end of the cylindrical portion 190a. The flange 190b is formed on the other end of the cylindrical portion 190a for retaining an end of one of the coil springs 17. This eliminates the need for the screws 20 used in the first embodiment.

While the present invention has been disclosed in terms of the preferred embodiment in order to facilitate a better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. An optical system for a TV camera comprising:
   an escutcheon;
   an FB adjusting ring installed on said escutcheon to be movable along an optical axis of the optical system;

a bracket having mounted thereon an image pick-up device, said bracket being disposed to be movable to or away from said escutcheon according to the movement of said FB adjusting ring for adjusting an flange back distance; and a retainer retaining said bracket on said escutcheon in optical alignment with each other, said retainer screwing said bracket to said escutcheon, while urging said bracket against said escutcheon elasticity.

2. An optical system as set forth in claim 1, wherein said retainer installs said bracket on said escutcheon at two support points diametrically opposed to each other with respect to the optical axis of the system.

3. An optical system as set forth in claim 1, wherein said retainer includes a pair of retaining assemblies each including a screw, a cylindrical member, and a coil spring, the coil spring being disposed around the cylindrical member between a flange portion formed on an end of the cylindrical member and said bracket, the cylindrical member having formed therein a through hole and passing through an opening formed in said bracket in constant engagement with said escutcheon, the screw being inserted through the through hole of the cylindrical member and threaded into said escutcheon for allowing said bracket to be moved between said escutcheon and the flange of each of the retaining assemblies.

4. An optical system as set forth in claim 1, wherein said retainer includes a pair of retaining assemblies each including a cylindrical member and a coil spring, the cylindrical member including a cylinder, a threaded portion extending from an end of the cylinder, and a flange formed on the other end of the cylinder, the coil spring being disposed around the cylinder between the flange and said bracket, the cylinder passing through an opening formed in said bracket in constant engagement with said escutcheon with the threaded portion being inserted into a threaded portion formed in said escutcheon for allowing said bracket to be moved between said escutcheon and the flange of each of the retaining assemblies.

* * * * *